(12) United States Patent
Takagi et al.

(10) Patent No.: US 6,188,682 B1
(45) Date of Patent: Feb. 13, 2001

(54) METHOD AND APPARATUS FOR RECEIVING CDMA RADIO COMMUNICATION

(75) Inventors: Hirofumi Takagi, Yokohama; Akihiro Higashi, Yokosuka, both of (JP)

(73) Assignee: NTT Mobile Communication Networks, Inc., Tokyo (JP)

(*) Notice: Under 35 U.S.C. 154(b), the term of this patent shall be extended for 0 days.

(21) Appl. No.: 08/896,023

(22) Filed: Jul. 17, 1997

(30) Foreign Application Priority Data

Jul. 24, 1996 (JP) .................................................. 8-194525

(51) Int. Cl.⁷ .................................................. H04B 7/216
(52) U.S. Cl. ........................................... 370/342; 370/310
(58) Field of Search .................................. 370/335, 336, 370/342, 331; 375/200, 209, 210

(56) References Cited

U.S. PATENT DOCUMENTS

| | | | |
|---|---|---|---|
| 5,511,067 | * 4/1996 | Miller | 370/335 |
| 5,652,765 | * 7/1997 | Adachi | 375/211 |
| 5,799,004 | * 8/1998 | Keskitalo | 370/335 |
| 5,809,020 | * 9/1998 | Bruckert | 370/335 |
| 5,881,058 | * 3/1999 | Chen | 370/335 |
| 6,009,089 | * 12/1999 | Huang | 370/342 |
| 6,021,123 | * 2/2000 | Mimura | 370/331 |

FOREIGN PATENT DOCUMENTS 0 691 754   1/1996 (EP) .
2291567     1/1996 (GB) .

OTHER PUBLICATIONS

Hulbert, A.P., "Comprehensive Rake—A Novel and Practical Receiver Architecture Offering Improved Performance," *IEEE Third International Symposium on Spread Spectrum Techniques and Applications*, vol. 2, Jul. 4–6, 1994, pp. 470–474.

* cited by examiner

*Primary Examiner*—Douglas W. Olms
*Assistant Examiner*—Ricardo M. Pizarro
(74) *Attorney, Agent, or Firm*—Pollock, Vande, Sande & Amernick, R.L.L.P.

(57) ABSTRACT

A receiving method using a CDMA radio receiver with a plurality of receiving fingers each composed of a code generator, a correlator and a detector. In a visited cell search while in the ON-state of the power supply, different long-period spreading codes are set in the code generators, and if none of correlated outputs from the correlators respectively corresponding to the code generators exceed a threshold value, then new different long-period spreading codes are set in the code generators. If any one of the correlator outputs exceeds the threshold value, the mobile station is decided as staying in the cell corresponding to the long-period spreading code set in that correlator, and this long-period spreading code and time points at which peaks of correlator outputs were obtained with the long-period spreading code are set in the receiving fingers in descending order of the magnitude of correlation peaks.

16 Claims, 8 Drawing Sheets

| ADDRESS | BS # | SPREADING CODE # |
|---------|------|------------------|
| 0001 | 001 | 0000000001 |
| 0002 | 002 | 0000000002 |
| 0003 | 003 | 0000000003 |
| ⋮ | ⋮ | ⋮ |

METHOD AND APPARATUS FOR RECEIVING CDMA RADIO COMMUNICATION

BACKGROUND OF THE INVENTION

The present invention relates to a receiving method and apparatus which performs a visited cell search and a neighbor cell search in radio communications using a CDMA radio access system.

With a conventional receiving apparatus in the CDMA radio communication system, a mobile station uses what is called a dedicated searcher whereby, at turn-on or during the standby state, a decision is made about the cell where the mobile station ought to stay or a search is conducted for surrounding cells or a multi-path that the mobile station receives.

Figures 1A, 1B:
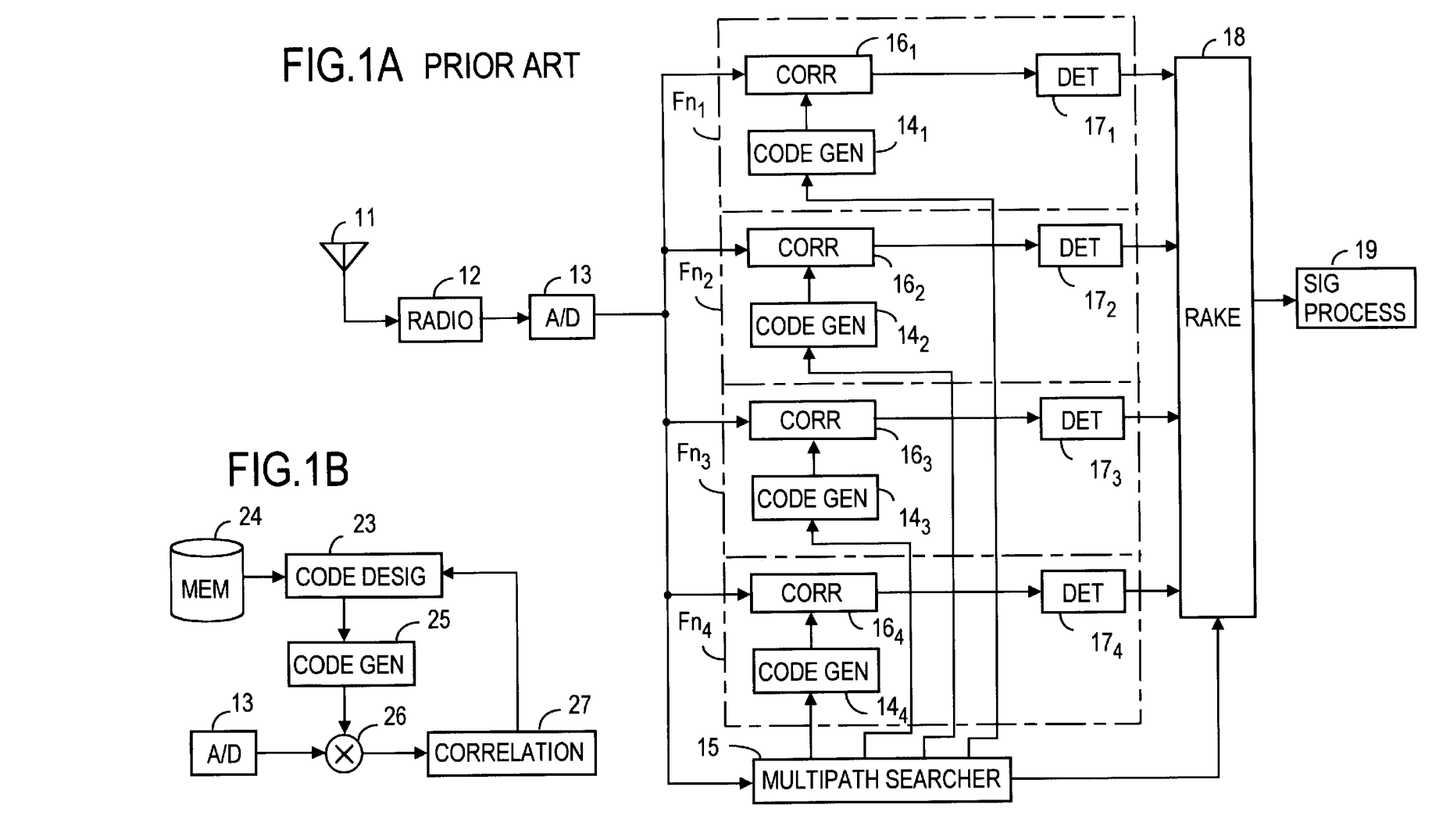
FIG. 1A is a block diagram illustrating the functional configuration of receiving equipment of a mobile station in a conventional CDMA radio communication system.
FIG. 1B is a block diagram showing the functional configuration of a multi-path searcher 15 in FIG. 1A.

In FIG. 1A there is shown in block form an example of the configuration of the receiver of the mobile station for the conventional CDMA radio communication. A signal received by an antenna 11 is demodulated by a radio part 12 into a base band signal, which is converted by an A-D converter 13 to a digital signal. Code generators $14_1$ to $14_4$ are each given spreading code information and frame timing detected by a multi-path searcher 15, and hence they generate codes synchronized with spreading codes used at the sending side. In correlators $16_1$ to $16_4$ the base band signal from the A-D converter 13 is despread through multiplication by the spreading codes from the code generators $14_1$ to $14_4$, by which the original signal can be detected. Thereafter, these despread signals are detected by detectors $17_1$ to $17_4$ and the detected outputs are combined by a RAKE combiner 18, whose combined output is fed to a signal processing part 19. Since signals from different transmission or propagation paths (a multi-path), contained in the received signal, can be separated by the despread processing in the correlators $14_1$ to $14_4$, this processing is a RAKE reception that has a diversity effect.

The mobile station receiver of the prior art configuration is provided with receiving fingers $Fn_i$ each composed of the code generator $14_i$, the correlator $16_i$ and the detector $17_i$ for despreading and detecting the received signal and the multi-path searcher 15 provided independently of the receiving finger $Fn_i$ to search for the multi-path in the receiving channel. A brief explanation will be given of the start-up operation of the mobile station at its turn-on, that is, an operation from a decision about its visited cell to the start of signal reception. When power is turned on, the mobile station accepts the base band signal from the A-D converter 13 by the multi-path searcher 15 and searches for the cell where the mobile station ought to stay. The multi-path searcher 15 has such a configuration as shown in FIG. 1B. A code number designator 23 reads out of a memory 24 a candidate for the spreading code of the base station and indicates to a code generator 25 a spreading code to be generated. The code generator 25 generates the designated spreading code, which is fed to a multiplier 26 for multiplication by the input signal from the A-D converter 13. A correlation value calculator 27 uses the multiplied output to calculate the value of correlation between the input signal and the spreading code generated by the code generator 25. A check is made to see if the thus computed correlation value is larger than a predetermined threshold value, thereby specifying the spreading code of the input signal and choosing the cell where the mobile station is staying. The spreading codes that are used to discriminate the cell usually have very long repetition periods. Hence, much time is spent in making a decision about the spreading code of the visited cell by examining the correlation between every long-period spreading code (also referred to simply as a long code) and the input signal.

In the conventional receiver configuration, the receiving fingers $Fn_1$ to $Fn_4$ are not equipped with a function of searching for the timing at which the correlation reaches its peak, and since the searcher 15 is provided separately of them to perform the cell search and the multi-path search, no fast searches can be expected. Additionally, a plurality of searchers must be prepared to implement fast searches.

In the CDMA radio communication system communications are performed using the same carrier frequency and the cell identification needs to be made after establishment of synchronization between the spreading code and the received signal. In a system that makes the cell identification on the basis of the kind or phase of the long-period spreading code (IS-95, for instance), the cell search requires a very large number of candidates for the long-period spreading codes. Besides, the repetition period of each long-period spreading code is so long that much time is needed to make a decision about the spreading code.

SUMMARY OF THE INVENTION

It is therefore an object of the present invention to provide a receiving scheme which permits a fast cell search using long codes without a substantial increase in the circuit scale.

To attain the above objective, no dedicated searcher is provided but a plurality of receiving fingers of the same configuration are each adapted to function as a searcher or RAKE receiving finger according to the circumstances.

According to the present invention, the method for reception by CDMA radio communication receiving equipment, which has a plurality of receiving fingers for extracting received data resulting from despreading the received signal by a plurality of spreading codes from code generating means, is characterized by a step of using at least one of the plurality of receiving fingers to make a cell search.

In the above method, all the receiving fingers may simultaneously conduct the cell search with different spreading codes set therein at the start-up of the receiver.

In the above method, while in a standby mode of the receiver, the receiving fingers may each perform the cell search and the control channel reception alternately.

In the above method, while in standby mode and communication mode of the receiver, at least one of the receiving fingers may be used for a communication channel reception and the remaining receiving fingers for the cell search.

In the above method, while in the standby mode, the number of receiving fingers used for the control channel reception and the number of receiving fingers for the cell search may be changed complementarily according to the control channel receiving level.

In the above method, while in the standby mode, it is possible to detect a multi-path in the control channel and change the control channel receiving timing with variations in the detected multi-path.

In the above method, it is possible to employ a scheme in which the spreading code in the control channel and new timing at which the multi-path receiving level is higher than a threshold value are set in one receiving finger not used for the control channel reception, then this receiving finger is caused to begin the control channel reception and the control channel receiving finger of the lowest receiving level is stopped from receiving the control channel.

In the above method, the numbers of receiving fingers used for the communication channel reception and for the cell search may be changed complementarily with the maximum communication channel receiving level while in the communication mode.

In the above method, while in the communication mode, it is possible to detect a multi-path in the communication channel and change the communication channel receiving timing with variations in the detected multi-path.

In the above method, it is possible to employ a scheme in which the spreading code in the communication channel and new timing at which the multi-path receiving level is higher than a threshold value are set in one receiving finger not used for the communication channel reception, then this receiving finger is caused to begin the communication channel for reception and the communication channel the receiving finger of the lowest receiving level is stopped from the reception of the communication channel.

The CDMA radio receiver according to the present invention, which has a plurality of receiving fingers each provided for extracting received data obtained by despreading the received signal with a plurality of spreading codes from code generating means, is provided with cell search control means which sets different spreading codes in one or more of the receiving fingers and performs a cell search using a correlation value input therefrom.

DESCRIPTION OF THE PREFERRED EMBODIMENT

Figure 2:
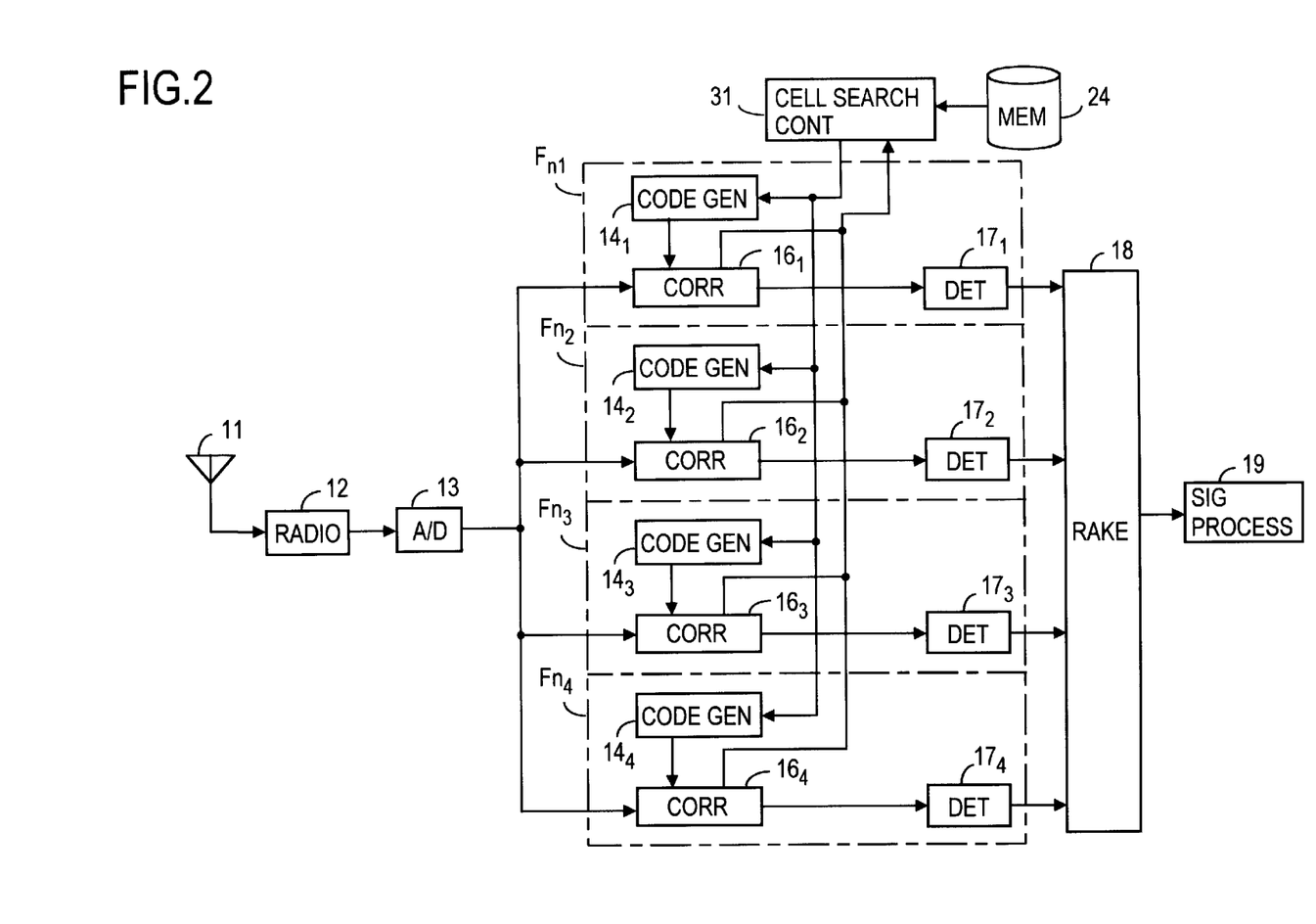
FIG. 2 is a block diagram illustrating the functional configuration of an embodiment of the present invention.
Figure 3:
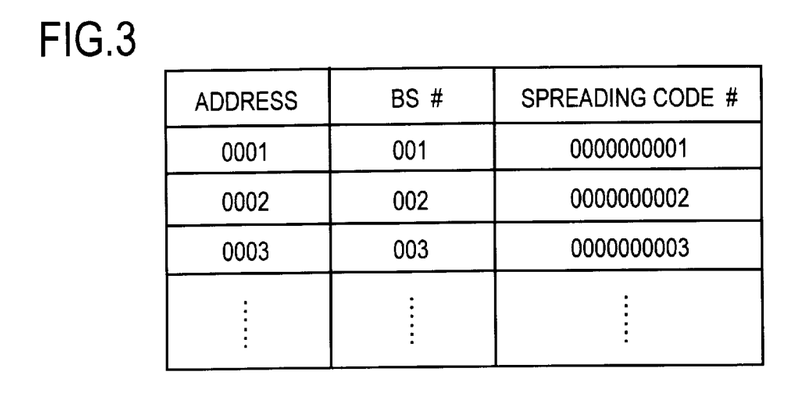
FIG. 3 is showing an example of a table of correspondence between spreading codes and base stations held in a memory 24 of the mobile station.

In FIG. 2 there is illustrated in block form an example of the configuration of a mobile station receiver that embodies the present invention, the parts corresponding to those in FIG. 1A being identified by the same reference numerals. This embodiment differs from the FIG. 1A prior art example in that the multi-path searcher 15 is not used and that a memory 24 with spreading code numbers stored therein and a cell search control section 31 are provided. In the memory 24 there are prestored at its addresses respective base station numbers and code numbers of long-period spreading codes corresponding thereto as shown in FIG. 3.

In the CDMA mobile communication system, each cell usually has its communication channel, control channel and pilot channel formed by combinations of one long-period spread code (long code) and a plurality (three, for example) of short-period spreading codes (also referred to simply as short codes). The cells use different long-period spreading codes but may share the same triad of short-period spreading codes. The term "spreading code" shall hereinafter refer to the long-period spreading code or its pair with each short-period spreading code. The base station of each cell always sends over the pilot channel a pilot signal that contains information identifying the base station, information identifying base stations of the neighbor cells and maintenance information. The mobile station measures receiving levels (or SN ratios) in pilot channels of a plurality of cells, by which it is possible to detect the base station closest to the mobile station, that is, its visited cell. Further, the surrounding cell information (information on the long-period spreading codes used in the surrounding cells) can be obtained by receiving the pilot channel from the base station of the visited cell. The control channel is used to send and receive call and other communication control signals.

The base station sends the communication signal after multiplying (exclusive-ORing) it by the spreading code and the mobile station multiplies (exclusive-ORs) the spread communication signal by a despreading code to obtain the communication signal. The despreading code that the mobile station uses in this instance is exactly the same as the spreading code used by the base station. Consequently, when the afore-mentioned pair of long- and short-period spreading codes is used as the spreading code, the despreading code that the mobile station uses must be the same pair of long- and short-period codes. The present invention concerns the reception of the CDMA signal in the mobile station and despreads the received signal by the despreading code, but since the despreading code is exactly the same as the spreading code used at the sending side, the despreading code will hereinafter be referred to simply as a spreading code.

Since it is unknown when the base station calls up the mobile station, the latter needs to monitor the control channel at all times, but with a view to saving the power consumption of the mobile station, it is general practice in the art to periodically perform the control channel reception to see if there is an incoming call to the mobile station. This state is called a standby state. In some mobile communication systems the pilot channel is used also as a control channel, in which case the receiving level of the control channel is measured to determine the visited cell or obtain information about the neighbor cells. In the following description of the invention, the measurement of the control channel receiving level and received information of the control channel shall mean either measurement of the receiving level and received information of the pilot channel or measurement of the receiving level and received information of the control channel according to the mobile communication system used.

The mobile station receiver of this embodiment is common to the prior art example of FIG. 1, that in the signal flow that the radio signal received by the antenna 11 is converted to a base band signal, then despread and combined by the RAKE combiner, thereafter being fed to the signal processing part 19. As compared with the traditional configuration, this embodiment does not employ the independent multipath searcher 15 but performs the cell search by a cell search controller 31 through the use of the receiving fingers $Fn_1$ to $Fn_4$. The mode of operation of the mobile station consists of (a) a visited cell control channel search mode (hereinafter referred to as a start-up mode) that immediately follows the turn-on of the mobile station, (b) an incoming call standby mode (i.e. standby mode) after capturing the control channel of the visited cell and (c) a communication mode as shown in FIGS. 4 and 5 which are timing charts illustrating two examples of the receiving operation according to the present invention.

Figure 4:
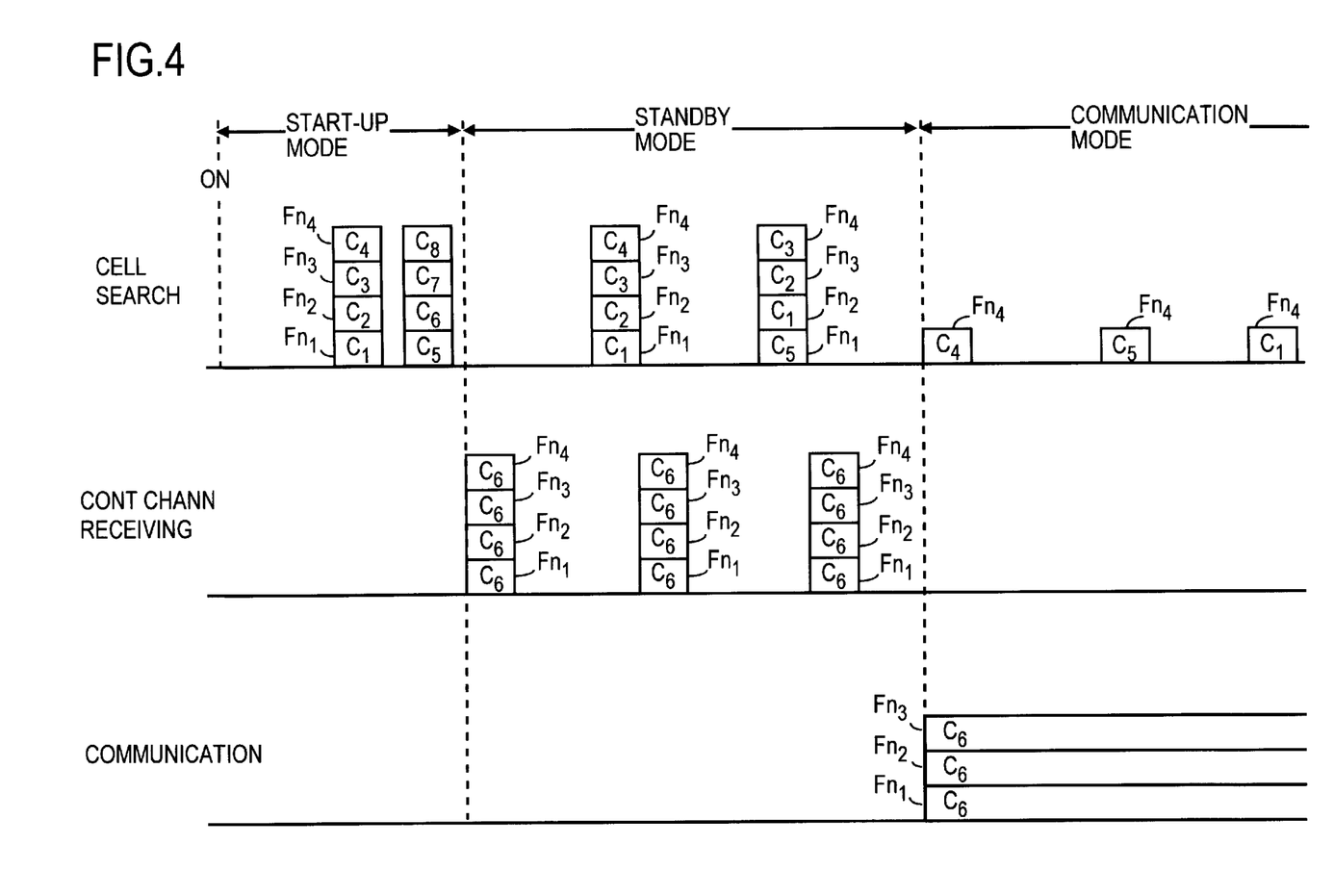
FIG. 4 is a timing chart showing an example of the receiving operation embodying the present invention.
Figure 5:
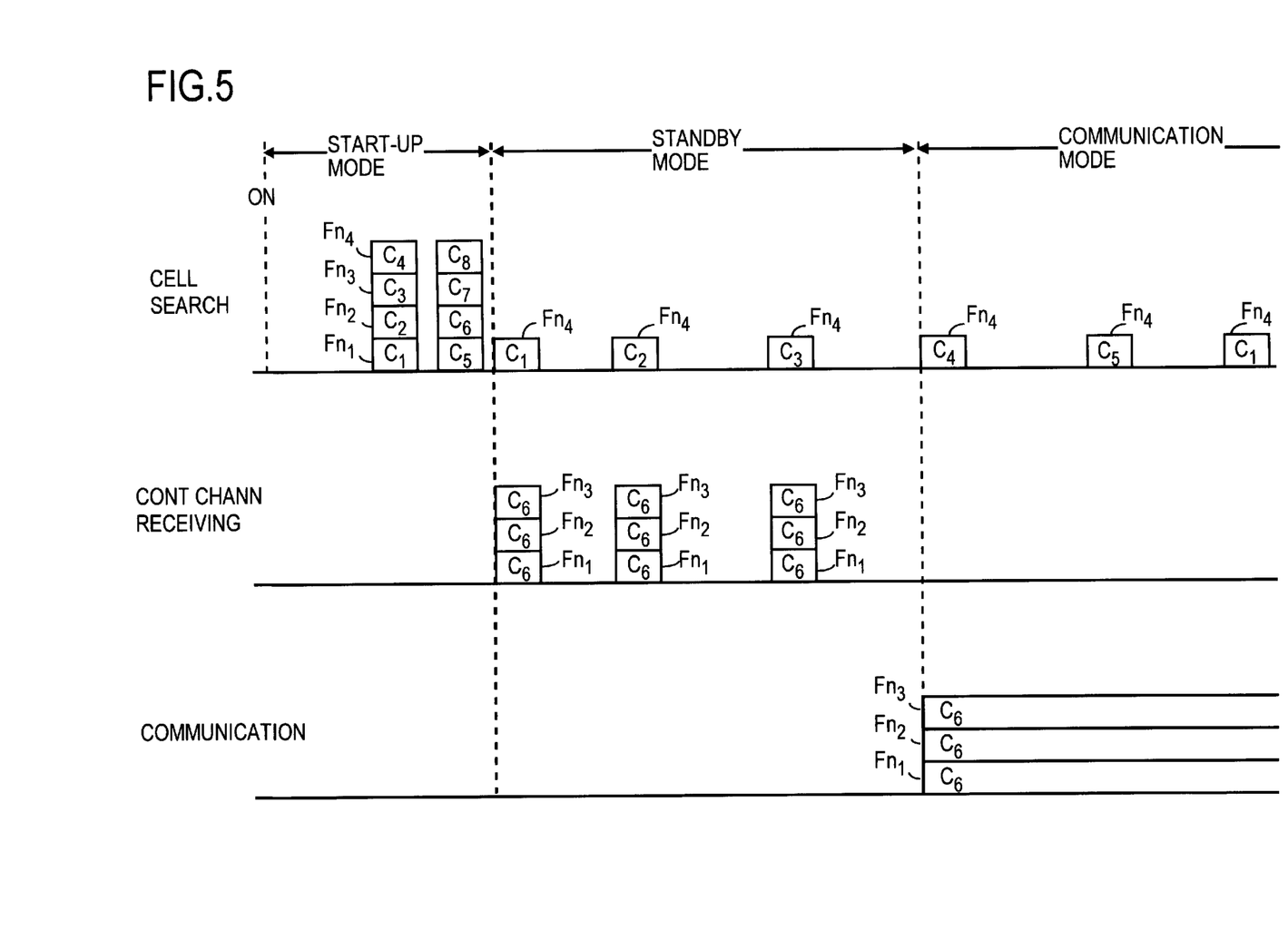
FIG. 5 is a timing chart showing another example of the receiving operation embodying the present invention.

In either of the examples depicted in FIGS. 4 and 5, all the receiving fingers $Fn_1$ to $Fn_4$ are used to conduct the cell search in the start-up mode. In the communication mode one or more receiving fingers are used for the cell search and the remaining receiving fingers for the communication channel reception. The examples of operation shown in FIGS. 4 and 5 differ from each other in the operation in the standby mode. In the FIG. 4 example, all the receiving fingers alternate between the cell search (measurements of the maximum receiving level and its timing) and the control channel reception, whereas in the FIG. 5 example one or more receiving fingers conduct the cell search and the remaining receiving fingers conduct the control channel reception. In any of these three modes of operation, the mobile station always makes a check to determine, with which cell it is currently staying, i.e. the base station that is the closest to the mobile station. A description will be given of each mode of operation by the receiving method according to the present invention.

(a) Start-Up Mode

Figure 6:
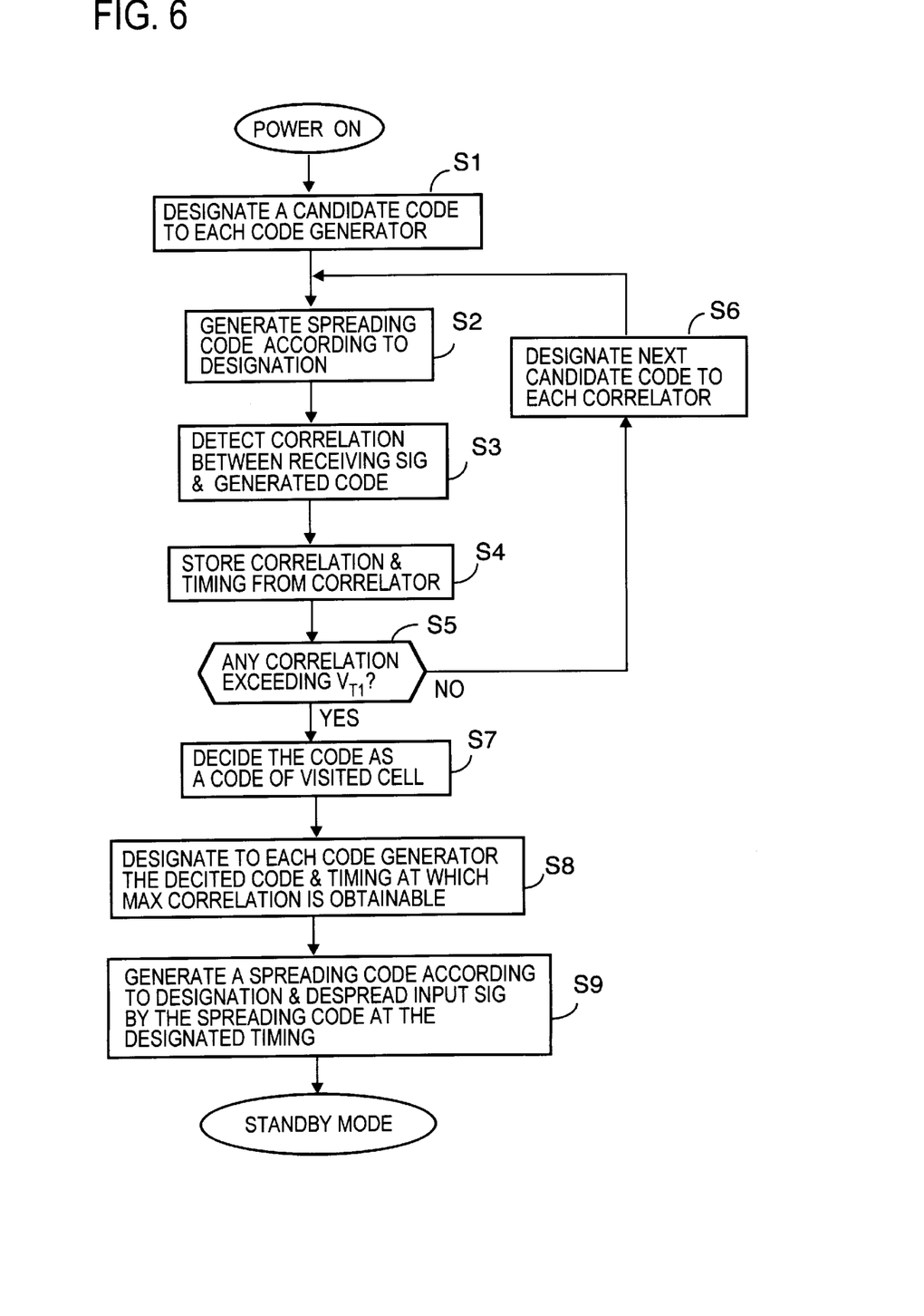
FIG. 6 is a flowchart illustrating a control channel searching operation after power-on which embodies the cell search method according to the present invention.

Upon turn-on, the mobile station makes a decision about its visited zone, following the procedure shown in FIG. 6. The cell search controller 31 reads out of the memory 24 spreading code candidates of the same number as the receiving fingers, that is, four candidates $C_1$ to $C_4$ in the examples of FIGS. 4 and 5, and sets them in the code generators $14_1$ to $14_4$ independently of one another (step S1). The code generators $14_1$ to $14_4$ generate the specified spreading codes (step S2). The correlators $16_1$ to $16_4$ each calculate the value of correlation between a different one of the thus generated spreading codes and the input signal (step S3). The cell search controller 31 stores the maximum correlation value computed by each correlator (corresponding to the receiving level) and the timing at which it was obtained (step S4). The cell search controller 31 compares the computed correlation values and a predetermined threshold value $V_{T1}$ (step S5), and when the receiving levels of any of the spreading code candidates do not exceed the threshold value $V_{T1}$, the cell search controller 31 reads out four new spreading code candidates $C_5$ to $C_8$ from the memory 24 and sets them in the code generators $14_1$ to $14_4$ in step S6, then goes back to step S2 and repeats the processing of step S2 to S6 until a spreading code whose receiving level exceeds the threshold value $V_{T1}$ is found out in step S5. The examples of FIGS. 4 and 5 both show the case of detection wherein the receiving level of a spreading code candidate $C_6$ among the four spreading code candidates $C_5$ to $C_8$ of four cells selected second is in excess of the threshold value $V_{T1}$.

When one or mode spreading codes of receiving levels exceeding the threshold value $V_{T1}$ are detected in step S5, the spreading code that provides the maximum correlation value is chosen as the spreading code of the visited cell where the mobile station is currently staying (step S7). In the example of FIG. 4, peaks of the correlation values obtained with the spreading code $C_6$ are chosen as multi-path detected signals and the spreading code $C_6$ and the time points of the peak values are set in the code generators $14_1$ to $14_4$ of all the receiving fingers in descending order of the peak values (step S8). As a result of this, the four receiving fingers $Fn_1$ to $Fn_4$ begin RAKE reception in the control channel of the cell decided as the visited cell (step S9), putting the mobile station in the standby state. In the example of FIG. 5, however, since at least one receiving finger $Fn_4$ is used for cell search, the spreading code $C_6$ of the visited cell is set in the code generators of the remaining (three, for instance) receiving fingers $Fn_1$, $Fn_2$ and $Fn_3$ in step S8. Furthermore, the time points of a plurality of peaks of correlation values obtained with the spreading code $C_6$ are judged as the multi-path signal receiving time points and these time points are set in three correlators corresponding to the code generators with the spreading code $C_6$ set therein, as the timing (the receiving timing) for multiplying the spreading codes and the received signal, in descending order of the magnitude of the correlation values (step S8). As a result of this, the three receiving fingers $Fn_1$, $Fn_2$ and $Fn_3$ begin the reception of the control channel of the cell decided as the visited cell and the remaining receiving finger $Fn_4$ continues the cell search operation (step S9), placing the mobile station in the standby state.

(b) Standby Mode

Figure 7:
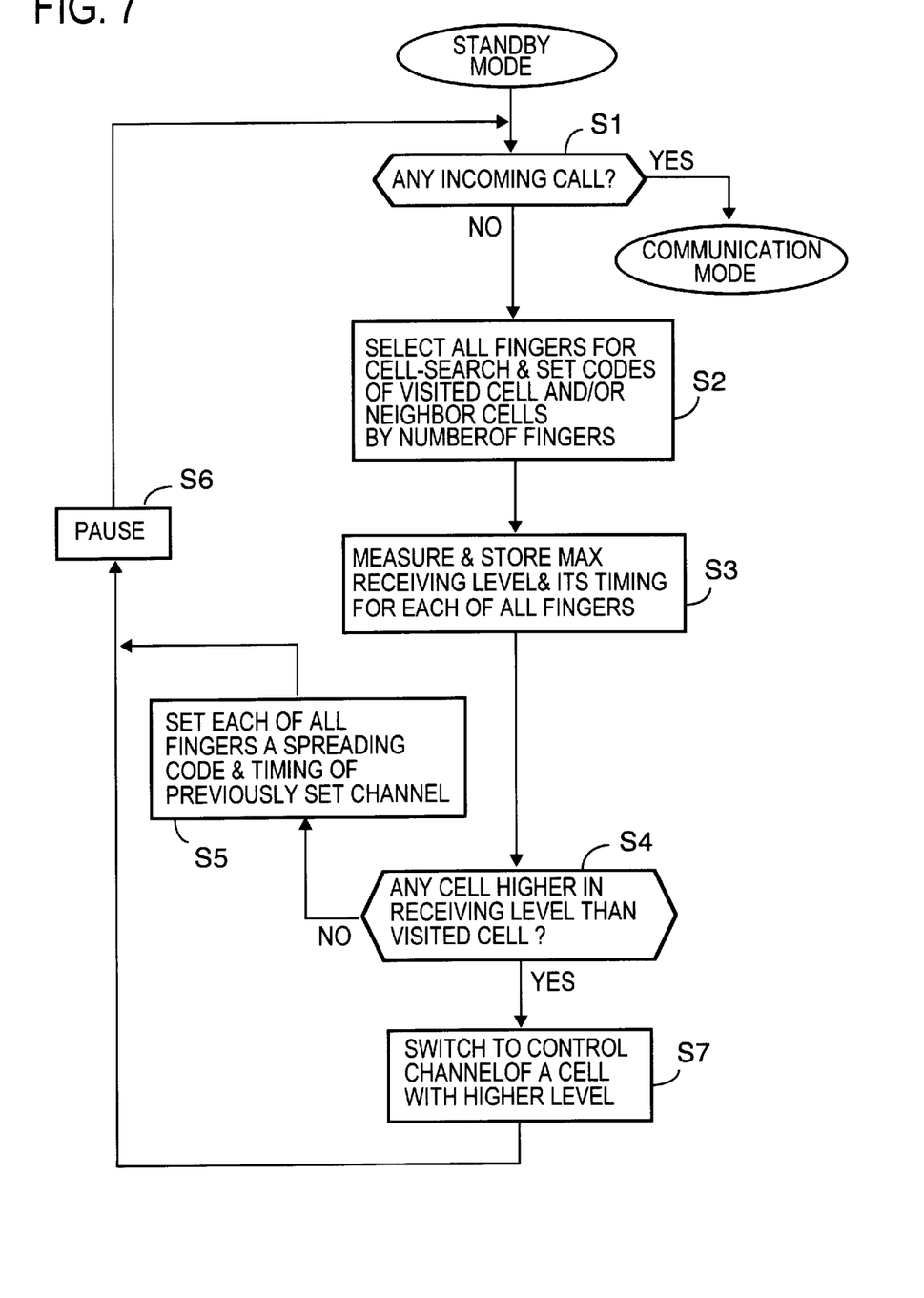
FIG. 7 is a flowchart showing an operation which embodies the cell search method according to the present invention in a standby mode.

Next, a description will be given, with reference to FIG. 7, of the cell search operation of the mobile station receiver of this embodiment in the standby mode. Having entered the incoming call waiting state following the capturing of the control channel of the visited cell base station (the detection of the visited cell spreading code) after turn-on, the mobile station periodically receives the control channel from the base station of the visited cell (the reception of the control signal) and periodically measures the receiving levels of the control channels of the visited and surrounding cells (cell search) as described below. That is, the mobile station receives the control channel of the visited cell by one or more receiving fingers (four receiving fingers $Fn_1$ to $Fn_4$ in the FIG. 4 example and three receiving fingers $Fn_1$, $Fn_2$ and $Fn_3$ in the FIG. 5 example) to watch for an incoming call destined for the mobile station as well as to get information about base stations of the surrounding cells (information about spreading codes in the control channels of the surrounding cells) (step S1). When an incoming call is detected, the mobile station goes into the communication mode described later one. In the FIG. 4 example, if no incoming call is detected, spreading codes of the same number as that of the receiving fingers (four in this example) are selected at one time from the spreading codes in the control channels of the visited and surrounding cells and set in the code generators $14_1$ to $14_4$ of all the receiving fingers $Fn_1$ to $Fn_4$ in step S2 so as to minimize the time that is needed for cell search. Next, in step S3 the peaks of the correlator outputs corresponding to each spreading code set in the code generators as mentioned above and their timing are measured. That is, the correlators $16_1$ to $16_4$ compute the values of correlation between the spreading codes fed from the respective code generators and the received signal. This makes it possible to measure the receiving levels of four surrounding cells at the same time in the FIG. 4 example, hence permitting the implementation of a fast cell search. In the example of FIG. 5, three spreading codes selected from control channel spreading codes of the visited cell and surrounding cells are set in the three receiving fingers $Fn_1$, $Fn_2$ and $Fn_3$ in step S2.

Next, in step S4 the cell search controller 31 monitors the receiving levels from the neighbor cells on the basis of the correlation values calculated by the correlators, making a check to see if there is a neighbor cell of a receiving level higher than that of the visited cell. If not, the preset spreading code $C_6$ corresponding to the control channel of the visited cell and its timing are set in each of the code generators $14_1$ to $14_4$ (three of them in the FIG. 5 example) in step S5, and in step S6 a timer works to stop the cell search controller 31 from operation for a predetermined period of time, followed by a return to step S1. When a neighbor cell of a receiving level higher than that of the visited cell is found in step S4, that cell is chosen as a new cell to which the mobile station is to move and in step S7 the spreading code corresponding to the control channel of the new cell and its timing are set in all the receiving fingers (three receiving fingers in the FIG. 5 example), and the operation goes to step S6. During quiescent operation in step S6, the power supply of the receiver is held OFF. By repeating steps S1 through S6, the receiving levels of the visited cell and neighbor cells are intermittently measured in the standby mode—this saves the power dissipation of the mobile station.

Figure 8:
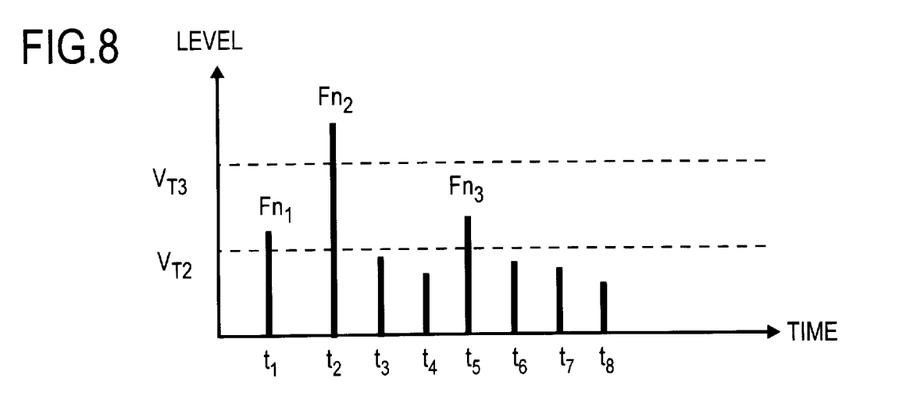
FIG. 8 is a graph showing, by way of example, the levels of multi-path signals detected by a control channel reception of a visited cell and the timings of their detection.

As described above, while in the standby state, one or more receiving fingers are used to periodically receive the control channel of the visited cell and the remaining receiving fingers are used to periodically measure the receiving levels of the visited and neighbor cells. FIG. 8 shows an example of the receiving level of the visited cell measured at the timing of the detection of respective propagation paths. In this example, for the application to the FIG. 5 example, three detecting time points $t_1$, $t_2$ and $t_3$ are set when the receiving level exceeds the threshold value $V_{T2}$, for example, in the code generators 161, 162 and 163 of the receiving fingers $Fn_1$, $Fn_2$ and $Fn_3$, and these receiving fingers use the same despreading code $C_6$ and periodically receive the control channel at the above-set timing. Upon receiving an incoming call in the control channel in step S1 in FIG. 7, the spreading code $C_6$ corresponding to the communication channel is set in the receiving fingers $Fn_1$, $Fn_2$ and $Fn_3$, placing the mobile station in the communication mode. In this instance, since signals in both of the communication and control channels are sent from the same base station (the same place), multi-paths in both channels can be regarded as the same. Hence, the timing for the control channel reception can be used intact for the multi-path reception as well.

In general, since the signal quality in the control channel may be lower than the signal quality in the communication channel, the number of receiving fingers that are used for the control channel reception in the standby mode may be smaller than the number of receiving fingers for the reception in the communication mode described later on. Furthermore, the number of receiving fingers that are used for the control channel reception may also be changed freely with the control channel receiving level as described below. When the maximum receiving level of the control channel is above a predetermined threshold value $V_{T3}$, only one receiving finger, for instance, is used to receive the control channel at the timing of the maximum receiving level and the remaining receiving fingers are all used for the cell search. When the maximum receiving level is in the range between the threshold values $V_{T3}$ and $V_{T2}$, two receiving fingers are used to perform RAKE reception at the timing of two receiving level peaks in descending order of level. When the maximum receiving level is below the threshold value $V_{T2}$, three receiving fingers are used for control channel RAKE reception at the timing of three peaks in decreasing order of level.

Figure 9:
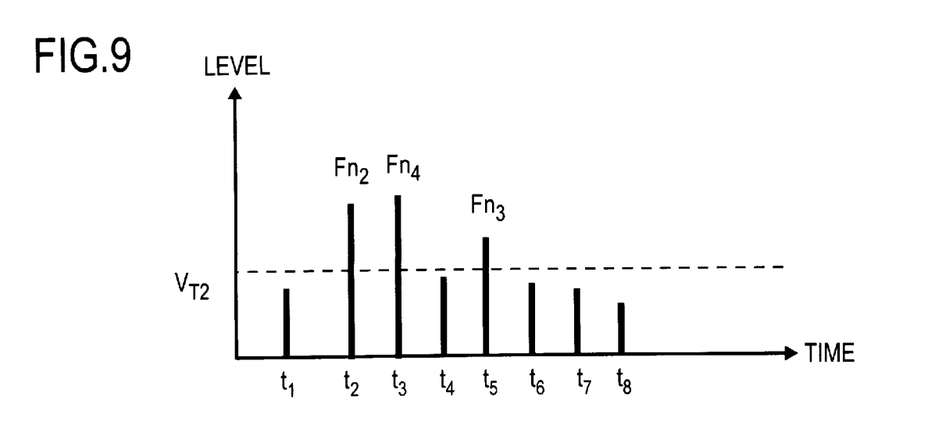
FIG. 9 is a graph showing, by way of example, variations in the detected levels of the multi-path.

In the case where the state of control channel multi-path reception by the three receiving fingers $Fn_1$, $Fn_2$ and $Fn_3$, shown in FIG. 8, changes with a multi-path variation to such a state as shown in FIG. 9 in which the peak at timing $t_1$ is below the threshold value $V_{T2}$ and the peak at timing $t_3$ is above the threshold value $V_{T2}$, the control channel reception by the receiving finger $Fn_1$ at timing $t_1$ is stopped and the receiving finger $Fn_1$ is assigned to the cell search (the receiving level measurement) and the control channel reception at timing $t_3$ is set in the receiving finger $Fn_4$. The fingers $Fn_2$ and $Fn_3$ continue the reception at time points $t_2$ and $t_3$. Thus, even if the multi-path receiving state changes, an optimum multi-path can be chosen for reception. When the receiving level of the control channel is high (and consequently the receiving level of the communication channel is high), the number of receiving fingers for the reception of the control channel of the visited cell (or the number of receiving fingers for the communication channel reception) can be decreased, and by additionally assigning the receiving fingers taken out of the control channel receiving operation to the cell search, the cell search rate can be increased, permitting reduction of each power-on time in the intermittent control channel reception.

(c) Communication Mode

Figure 10:
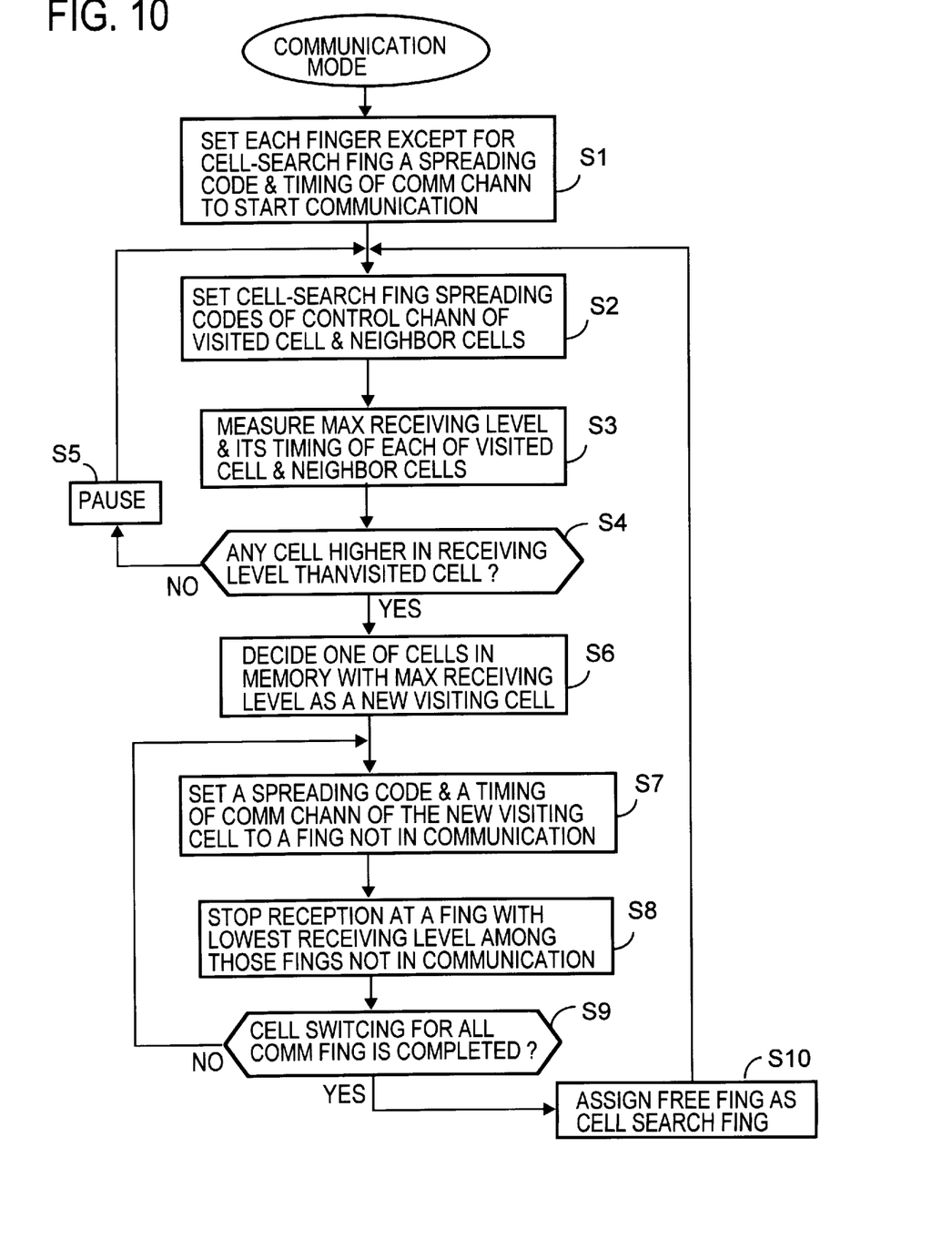
FIG. 10 is a flowchart showing a communication mode that embodies the cell search method according to the present invention.

Turning next to FIG. 10, an operation of this embodiment during communication, in particular, the outline of a cell transition during communication will be described. During communication some of the receiving fingers $Fn_1$ to $Fn_4$, selected as described above, are used to despread the received signal and the remaining receiving fingers are used for the cell search. Let it be assumed, for the sake of brevity, that only one receiving finger is used for the cell search as in the examples of FIGS. 4 and 5.

In the first place, the cell search controller 31 sets in the receiving fingers $Fn_1$, $Fn_2$ and $Fn_3$ (except that for the cell search) the same spreading code to be generated and the timing for multiplying it by the received signal, in descending order of magnitude of correlation (the receiving level) (step S1). During communication spreading codes of the visited and neighbor cells, based on neighbor cell information reported from the base station, are sequentially set in the receiving finger Fn4 used for the cell search (step S2) and the maximum receiving level received with the set spreading code set in each receiving finger and the timing of the maximum receiving level are measured and stored in the cell search controller 31 (step S3).

In step S4 a check is made for a neighbor cell of a receiving level above that of the visited cell stored in the cell search controller 31. If such a neighbor cell is not found, the cell search controller 31 pauses for a predetermined period of time in step S5 and then returns to step S2 to perform the cell search again. When it is decided in step S4 that one of the neighbor cells has a receiving level higher than that of the visited cell, the mobile station is determined to be moving toward that neighbor cell or in the course of transition thereto, and in step S6 it is decided that the neighbor cell of the receiving level higher than those of any other surrounding cells is a new cell toward which the mobile station is moving. In step S7 the spreading code corresponding to the communication channel of the new cell and the timing for its multiplication by the received signal are set in the receiving level $Fn_4$ currently not used for the communication channel reception, causing it to start receiving the communication channel. Next, in step S8 that one of the receiving fingers used for the reception of the communication channel of the visited cell which is the lowest in the receiving level is stopped from receiving the communication channel. In step S9 a check is made to see if all the receiving fingers engaged in receiving the communication channel of the visited cell have been switched to the reception of the communication channel of the new cell, and if not, the procedure goes back to step S7 to repeat the processing in steps S7 and S8. When it is decided in step S9 that the communication channel receiving fingers have all been switched to the reception of the communication channel of the new cell, the finger not used for the communication channel reception is newly set as a receiving finger for the cell search in step S10 and the procedure returns to step S2.

Also in the above communication mode, the numbers of receiving fingers that are used for the cell search and for the communication channel reception can be changed complementarily in accordance with the receiving level as in the case of the standby mode described previously with reference to FIGS. 8 and 9. This enhances the cell search efficiency. Besides, as the peak of the communication channel receiving level varies due to multi-path variations, the timing for receiving the communication channel may be changed following the same procedure as that described previously in respect of FIGS. 8 and 9.

In the above, matched filters or sliding correlators can be used as the correlators $16_1$ to $16_4$. Incidentally, a base station receiver may also be adapted to change the number of RAKE receiving fingers according to the type of mobile station.

Effect of the Invention

As described above, according to the present invention, the receiving fingers that normally despread the received signal are configured so that they can flexibly be used both for the visited cell search and the neighbor cell search. This reduces the time of turn-on of the mobile station to the time of starting its operation and hence improves various services, while at the same time the reduction of the time for cell search permits implementation of a longer waiting time.

It will be apparent that many modifications and variations may be effected without departing from the scope of the novel concepts of the present invention.

What is claimed is:

1. A method for reception by CDMA radio communication receiving equipment of a mobile station which performs a number of modes, including:

A start-up mode for searching a control channel immediately after power of the equipment is turned ON, a standby mode for awaiting a call while searching for a nearest one of base stations of corresponding cells neighboring a cell in which the mobile station currently resides, and a communication mode for performing communication through a communication channel, and which includes a plurality of receiving fingers each comprising a code generator for generating a spreading code, a correlator for despreading, with said spreading code, a received signal received from a base station to produce a despread signal as a correlation output, and a detector for performing signal detection on said despread signal to produce detection signal; a RAKE combiner for combining the detection signals from a plurality of the receiving fingers into a baseband data signal; and a cell-search controller for controlling the code generator of each of the receiving fingers to generate a spreading code with a timing designated by said cell-search controller based on the correlation result from the correlator; wherein said method comprises, in at least one of said start-up mode, said standby-mode and said communciation mode, periodically and successively setting, by said cell-search controller, the code generator of one or more of the receiving fingers, arbitrarily, spreading codes assigned to control channels of cells neighboring the residing cell to conduct cell search.

2. The method of claim 1, wherein said step (a) in said start-up mode includes a step of setting, by the cell-search controller, different spreading codes to the code generators of the respective code generators to conduct cell search.

3. The method of claim 2, wherein said step (a) in said standby mode includes a step in which said cell-search controller repeats, alternately, cell search and a control channel reception by said plurality of receiving fingers.

4. The method of claim 1 or 2, wherein in said standby mode, said step (a) includes a step in which said cell-search controller successively sets spreading codes, assigned to control channels of cells neighboring the cell in which said mobile station presently resides, to the code generator of said at least one of said plurality of receiving fingers to conduct cell search, and sets a spreading code assigned to a control channel of the cell in which said mobile station presently resides, and timing of the spreading code to the code generator of each of the remaining receiving fingers to conduct control channel reception.

5. The method of claim 1 or 2, wherein said step (a) in said standby mode includes a step in which said cell-search controller changes the number of receiving fingers assigned for a control channel reception and for said cell search complementarily to each other according to a receiving level of the control channel.

6. The method of claim 1 or 2, wherein said step (a) in said standby mode includes a step in which said cell-search controller detects a multi-path in a control channel based on the despread signal of one of said receiving fingers assigned for control channel reception and changes, in accordance with variations in said detected multi-path, the timing of the spreading code to be set to the code generators of each of the receiving fingers assigned for the reception of said control channel.

7. The method of claim 6, wherein said step (a) in said standby mode includes a step in which said cell-search controller detects peaks of the levels of control channel reception while shifting the timing of the spreading code to determine timing where the peaks exceed a predetermined threshold level and, when a new timing is found where a peak exceeding the threshold level has not been found, sets to the code generator of another one of the receiving fingers not in use for said control channel reception of the spreading code corresponding to said control channel and said new timing to start said another one of the receiving fingers with control channel reception, and stops control channel reception by one of the receiving fingers whose receiving level is lowest.

8. The method of claim 1 or 2, which further includes a step in which in said communication mode said cell-search controller detects a maximum one of the received signal levels obtained as output levels of the correlators of the receiving fingers assigned for communication channel reception and changes, in accordance with the maximum signal level, the numbers of the receiving fingers assigned for communication channel reception and those assigned for cell search.

9. A CDMA mobile station which performs a number of modes including a start-up mode for searching a control channel immediately after power of the mobile station is turned ON, a standby mode for awaiting a call while searching for a nearest one of base stations of corresponding cells neighboring a cell in which the mobile station currently resides, and a communication mode for performing communication through a communication channel, comprising:
- a plurality of receiving fingers each including:
  - a code generator for generating a spreading code;
  - a correlator for despreading, with said spreading code, a received signal received from a base station to produce a despread signal as a correlation output; and
  - a detector for performing signal detection on said despread signal to produce a detection signal;
- a RAKE combiner for combining the detection signals from a plurality of the receiving fingers into a baseband data signal; and
- a cell-search controller for controlling the code generator of each of the receiving fingers to generate a spreading code with a timing designated by said cell-search controller based on the correlation result from the correlator, wherein said cell-search controller sets, in at least one of said start-up mode, said standby mode and said communication mode, the code generator of at least one of the receiving fingers spreading codes assigned to control channels of cells.

10. The mobile station of claim 9, wherein in a start-up mode, said cell-search controller sets the code generator of each of said plurality of the receiving fingers to generate one of a plurality of spreading codes to conduct cell search.

11. The mobile station of claim 9, wherein in a communication mode said cell-search controller sets the code generator in at least one of said plurality of receiving fingers to generate a spreading code corresponding to a communication channel assigned to a cell in which said mobile station currently resides, and sets the code generators in the receiving fingers, other than said plurality of receiving fingers, to generate spreading codes corresponding to control channels assigned to the cells neighboring said cell in which said mobile station currently resides.

12. A CDMA mobile station which performs a number of modes including a start-up mode for searching a control channel immediately after power of the mobile station is turned ON, a standby mode for awaiting a call while searching for a nearest one of base stations of corresponding cells neighboring a cell in which the mobile station currently resides, and a communication mode for performing communication through a communication channel, comprising:
- a plurality of receiving fingers each including:
  - a code generator for generating a spreading code;
  - a correlator for despreading, with said spreading code a received signal received from a base station to produce a despread signal as a correlation output; and
  - a detector for performing signal detection on said despread signal to produce a detection signal;
- RAKE combiner for combining the detection signals from a plurality of the receiving fingers into a baseband data signal; and
- a cell-search controller for controlling the code generator of each of the receiving fingers to generate a spreading code with a timing designated by said cell-search controller based on the correlation result from the correlator, wherein said cell-search controller sets, in at least one of said start-up mode, said standby mode and said communication mode, the code generator of at least one of the receiving fingers spreading codes assigned to control channels of cells;
- wherein in a communication mode said cell-search controller sets the code generator in at least one of said plurality of receiving fingers to generate a spreading code corresponding to a communication channel assigned to a cell in which said mobile station currently resides, and sets the code generators in the receiving fingers, other than said plurality of receiving fingers, to generate spreading codes corresponding to control channels assigned to the cells neighboring said cell in which said mobile station currently resides;
- and further wherein said cell-search controller controls, depending on output level of the despread signal produced during reception of a control channel, a number of the receiving fingers in which the code generators are set for cell search to generate spreading codes of control channels assigned to cells neighboring a cell in which the mobile station currently resides.

13. The mobile station of claim 12, wherein said cell-search controller controls, depending on variation in multi-paths detected as different timings of peak levels in the despread signal, the timing of spreading codes to be generated by the code generators for communication channels.

14. The mobile station of claim 12, wherein said cell-search controller selects a predetermined number of largest peak levels of the despread signal and controls the code generators of said predetermined number of the receiving fingers to generate spreading codes with the selected timing.

15. A CDMA mobile station which performs a number of modes including a start-up mode for searching a control channel immediately after power of the mobile station is turned ON, a standby mode for awaiting a call while searching for a nearest one of base stations of corresponding cells neighboring a cell in which the mobile station currently resides, and a communication mode for performing communication through a communication channel, comprising:
- a plurality of receiving fingers each including:
  - a code generator for generating a spreading code;
  - a correlator for despreading, with said spreading code, a received signal received from a base station to produce a despread signal as a correlation output; and
  - a detector for performing signal detection on said despread signal to produce a detection signal;
- a RAKE combiner for combining the detection signals from a plurality of the receiving fingers into a baseband data signal; and
- a cell-search controller for controlling the code generator of each of the receiving fingers to generate a spreading code with a timing designated by said cell-search controller based on the correlation result from the correlator, wherein said cell-search controller sets, in at least one of said start-up mode, said standby mode and said communication mode, the code generator of at least one of the receiving fingers spreading codes assigned to control channels of cells;
- wherein in a communication mode said cell-search controller sets the code generator in at least one of said plurality of receiving fingers to generate a spreading code corresponding to a communication channel assigned to a cell in which said mobile station currently resides, and sets the code generators in the receiving fingers, other than said plurality of receiving fingers, to generate spreading codes corresponding to control channels assigned to the cells neighboring said cell in which said mobile station currently resides;
- and further wherein said cell-search controller controls, depending on variation in multi-paths detected as different timings of peak levels in the despread signal, the timing of spreading codes to be generated by the code generators for communication channels.

16. A CDMA mobile station which performs a number of modes including a start-up mode for searching a control channel immediately after power of the mobile station is turned ON, a standby mode for awaiting a call while searching for a nearest one of base stations of corresponding cells neighboring a cell in which the mobile station currently resides, and a communication mode for performing communication through a communication channel, comprising:

- a plurality of receiving fingers each including:
  - a code generator for generating a spreading code;
  - a correlator for despreading, with said spreading code, a received signal received from a base station to produce a despread signal as a correlation output; and
  - a detector for performing signal detection on said despread signal to produce a detection signal;
- a RAKE combiner for combining the detection signals from a plurality of the receiving fingers into a baseband data signal; and
- a cell-search controller for controlling the code generator of each of the receiving fingers to generate a spreading code with a timing designated by said cell-search controller based on the correlation result from the correlator, wherein said cell-search controller sets, in at least one of said start-up mode, said standby mode and said communication mode, the code generator of at least one of the receiving fingers spreading codes assigned to control channels of cells;

wherein in a communication mode said cell-search controller sets the code generator in at least one of said plurality of receiving fingers to generate a spreading code corresponding to a communication channel assigned to a cell in which said mobile station currently resides, and sets the code generators in the receiving fingers, other than said plurality of receiving fingers, to generate spreading codes corresponding to control channels assigned to the cells neighboring said cell in which said mobile station currently resides;

and further wherein said cell-search controller selects a predetermined number of largest peak levels of the despread signal and controls the code generators of said predetermined number of the receiving fingers to generate spreading codes with the selected timing.

* * * * *